(12) United States Patent
MacLean et al.

(10) Patent No.: US 10,821,806 B2
(45) Date of Patent: Nov. 3, 2020

(54) VALVE ASSEMBLY WITH SHAPE-MEMORY ALLOY WIRES AND METHOD OF USING THE SAME

(71) Applicant: Ford Global Technologies, LLC, Dearborn, MI (US)

(72) Inventors: Eric J. MacLean, Brighton, MI (US); David Arthur Wade, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 304 days.

(21) Appl. No.: 15/663,957

(22) Filed: Jul. 31, 2017

(65) Prior Publication Data

US 2019/0030988 A1 Jan. 31, 2019

(51) Int. Cl.
| | |
|---|---|
| *B60H 1/00* | (2006.01) |
| *F03G 7/06* | (2006.01) |
| *B60H 1/24* | (2006.01) |
| *B60H 1/26* | (2006.01) |
| *F16K 1/20* | (2006.01) |
| *F16K 31/02* | (2006.01) |

(52) U.S. Cl.
CPC ......... *B60H 1/00828* (2013.01); *B60H 1/248* (2013.01); *B60H 1/249* (2013.01); *B60H 1/26* (2013.01); *F03G 7/06* (2013.01); *F03G 7/065* (2013.01); *F16K 1/2007* (2013.01); *F16K 31/025* (2013.01)

(58) Field of Classification Search
CPC ........................ B60H 1/00828; B60H 1/00735; B60H 1/248; B60H 1/18249; B60H 1/26; F03G 7/06; F03G 7/065; F16K 31/025

USPC ............................................................ 454/70
See application file for complete search history.

(56) References Cited

U.S. PATENT DOCUMENTS

| | | | |
|---|---|---|---|
| 8,377,115 B2 * | 2/2013 | Thompson ............ | A61F 2/2427 623/1.24 |
| 8,708,787 B2 * | 4/2014 | Alexander ............. | B60H 1/008 454/162 |
| 9,346,345 B2 | 5/2016 | Alexander et al. | |
| 2005/0121946 A1 * | 6/2005 | McKnight ............ | B60K 11/085 296/180.1 |
| 2010/0112924 A1 * | 5/2010 | Alexander ............ | F16K 31/025 454/70 |
| 2010/0330894 A1 * | 12/2010 | Alexander ............. | B60H 1/249 454/70 |

(Continued)

FOREIGN PATENT DOCUMENTS

| | | |
|---|---|---|
| DE | 10330621 A1 | 2/2005 |
| DE | 102004046273 A1 | 4/2006 |

*Primary Examiner* — Helena Kosanovic
(74) *Attorney, Agent, or Firm* — David Coppiellie; Carlson, Gaskey & Olds, P.C.

(57) ABSTRACT

This disclosure relates to a valve assembly for a motor vehicle, such as a pressure relief valve, and a method of using the same. The valve assembly includes a flap moveable to between an open position and a closed position. The valve assembly further includes a pair of shape memory-alloy (SMA) wires configured to move the flap between the open and closed positions. Specifically, the valve includes a first shape-memory alloy wire configured to rebound to a first rebound shape to urge the flap to the open position, and a second shape-memory alloy wire configured to rebound to a second rebound shape to urge the flap to the closed position.

7 Claims, 5 Drawing Sheets

(56) References Cited

U.S. PATENT DOCUMENTS

2013/0072101 A1 3/2013 Marleau, Jr. et al.
2016/0363230 A1 12/2016 Dankbaar et al.

* cited by examiner

FIG.7B

VALVE ASSEMBLY WITH SHAPE-MEMORY ALLOY WIRES AND METHOD OF USING THE SAME

TECHNICAL FIELD

This disclosure relates to a valve assembly for a motor vehicle, such as a pressure relief valve, and a method of using the same. The valve assembly includes shape-memory alloy wires configured to open and close the valve.

BACKGROUND

Many vehicles include pressure relief valves (sometimes referred to as "air extractors") configured to mitigate pressure build-up in the vehicle. Pressure build-up may be caused when rapidly closing a door or when opening a window of the vehicle, as examples. In the former example, the pressure build-up created by the rapidly closing door can make it difficult to close the door, or prevent the door from being closed altogether. In latter example, the pressure build-up causes a phenomenon sometimes referred to as "wind throb," which can cause passenger discomfort. With only one window open in the vehicle, air trying to enter through the open window generates a low frequency pressure pulsation, which is perceived as a "throbbing" sensation. Pressure relief valves are vents, typically in the rear of the vehicle, that provide an air flow path through the vehicle and mitigate pressure build-up.

SUMMARY

A valve assembly for a motor vehicle according to an exemplary aspect of the present disclosure includes, among other things, a flap moveable to between an open position and a closed position, a first shape-memory alloy wire configured to rebound to a first rebound shape to urge the flap to the open position, and a second shape-memory alloy wire configured to rebound to a second rebound shape to urge the flap to the closed position.

In a further non-limiting embodiment of the foregoing valve assembly, the valve assembly includes a controller configured to selectively command one of the first and second shape-memory alloy wires to move to a respective one of the first and second rebound shapes.

In a further non-limiting embodiment of any of the foregoing valve assemblies, the first shape-memory alloy wire and the second shape-memory alloy wire provide a first set of flap-moving wires, and the valve assembly includes a plurality of sets of flap-moving wires.

In a further non-limiting embodiment of any of the foregoing valve assemblies, the flap includes a hinged end and a free end, and the first and second shape-memory alloy wires project from the hinged end substantially to the free end.

In a further non-limiting embodiment of any of the foregoing valve assemblies, the flap includes a first side and a second side between the hinged end and the free end, and a first set of flap-moving wires is positioned adjacent the first side and a second set of flap-moving wires is positioned adjacent the second side.

In a further non-limiting embodiment of any of the foregoing valve assemblies, a third set of flap-moving wires is positioned substantially between the first and second sides.

In a further non-limiting embodiment of any of the foregoing valve assemblies, the flap is one of a plurality of flaps, and each of the flaps includes at least one set of flap-moving wires.

In a further non-limiting embodiment of any of the foregoing valve assemblies, each of the first shape-memory alloy wires and each of the second shape-memory alloy wires are configured to rebound to a respective first and second rebound shape upon application of heat.

In a further non-limiting embodiment of any of the foregoing valve assemblies, the valve assembly further includes a current source. Further, the controller is configured to selectively command the current source to direct current to one of the first and second shape-memory alloy wires.

In a further non-limiting embodiment of any of the foregoing valve assemblies, the first shape-memory alloy wires are electrically coupled to the current source in series, and where the second shape-memory alloy wires are electrically coupled to the current source in series.

In a further non-limiting embodiment of any of the foregoing valve assemblies, the flap is overmolded with the first and second shape-memory alloy wires.

A motor vehicle according to another exemplary aspect of the present disclosure includes, among other things, a valve including a flap moveable to between an open position and a closed position. The valve further includes first and second shape-memory alloy wires configured to rebound to different rebound shapes to urge the flap to the open and closed positions, respectively.

In a further non-limiting embodiment of the foregoing motor vehicle, the motor vehicle includes a controller configured to selectively command one of the first and second shape-memory alloy wires to move to a respective one of the first and second rebound shapes.

In a further non-limiting embodiment of any of the foregoing motor vehicles, the first and second shape-memory alloy wires are configured to rebound to a respective first and second rebound shape upon application of heat.

In a further non-limiting embodiment of any of the foregoing motor vehicles, the motor vehicle includes a current source. Further, the controller is configured to selectively command the current source to direct current to one of the first and second shape-memory alloy wires.

In a further non-limiting embodiment of any of the foregoing motor vehicles, the valve is a pressure relief valve configured to relieve pressure build-up within the vehicle when the flap is in the open position.

A method according to yet another exemplary aspect of the present disclosure includes, among other things, opening a valve by activating a first shape-memory alloy wire and closing the valve by activating a second shape-memory alloy wire.

In a further non-limiting embodiment of the foregoing method, the first shape-memory alloy wire is configured to rebound to a first rebound shape to open the valve and the second shape-memory alloy wire is configured to rebound to a second rebound shape to close the valve.

In a further non-limiting embodiment of any of the foregoing methods, the step of opening the valve includes applying heat to the first shape-memory alloy wire, and the step of closing the valve includes applying heat to the second shape-memory alloy wire.

In a further non-limiting embodiment of any of the foregoing methods, heat is selectively applied to the first and second shape-memory alloy wires by selectively directing current through the first and second shape-memory alloy wires.

DETAILED DESCRIPTION

This disclosure relates to a valve assembly for a motor vehicle, such as a pressure relief valve (sometimes referred to as an "air extractor"), and a method of using the same. The valve assembly includes a flap moveable to between an open position and a closed position. The valve assembly further includes a pair of shape memory-alloy (SMA) wires configured to move the flap between the open and closed positions. Specifically, the valve includes a first shape-memory alloy wire configured to rebound to a first rebound shape to urge the flap to the open position, and a second shape-memory alloy wire configured to rebound to a second rebound shape to urge the flap to the closed position. The shape-memory alloy wires actively open and close the valve to mitigate the effects of pressure build-up inside the vehicle. The valve assembly thus increases passenger comfort. Further, the disclosed valve assembly is relatively easy to manufacture and provides a reliable valve assembly.

Figure 1:
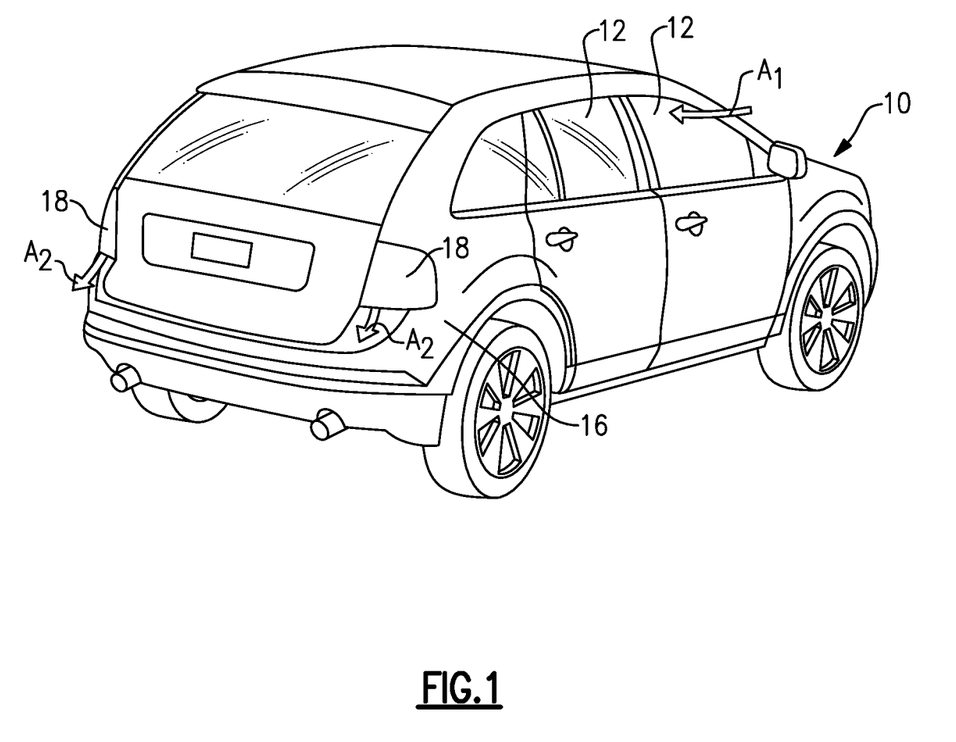
FIG. 1 is a rear-perspective view of a motor vehicle with an example valve assembly.

FIG. 1 illustrates a motor vehicle 10, which in this example is an SUV. The vehicle 10 includes a plurality of windows 12. In FIG. 1, a front passenger-side window 12 is open, allowing air $A_1$ to enter the vehicle. In this example, there are no other windows open. The vehicle 10 further includes at least one valve assembly configured to allow air $A_2$ to exit the passenger cabin of the vehicle 10.

In this example, the valve assembly is a pressure relief valve, and the vehicle 10 includes two pressure relief valves 14 (FIG. 2) adjacent the rear fascia 16 of the vehicle. It should be understood that the vehicle 10 could include one or more pressure relief valves 14. Specifically, the pressure relief valves 14 are covered by tail lamps 18 in this example. While the pressure relief valves 14 are positioned adjacent the tail lamps 18, the pressure relief valves 14 could be in other locations, such as adjacent a rear license plate mount or a rear bumper of the vehicle 10.

The pressure relief valves 14 are configured to allow air $A_2$ to exit the passenger cabin of the vehicle, which mitigates or eliminates the effects of pressure build-up within the vehicle 10. For example, without the pressure relief valves 14, the air $A_1$ could create a "wind throb" effect that causes passenger discomfort. Another example of pressure build-up is caused when a passenger suddenly shuts a vehicle door, such as the liftgate. Without the pressure relief valves 14, if the liftgate were closed too quickly, it may be unable to be closed at all due to pressure build-up.

Figure 2:
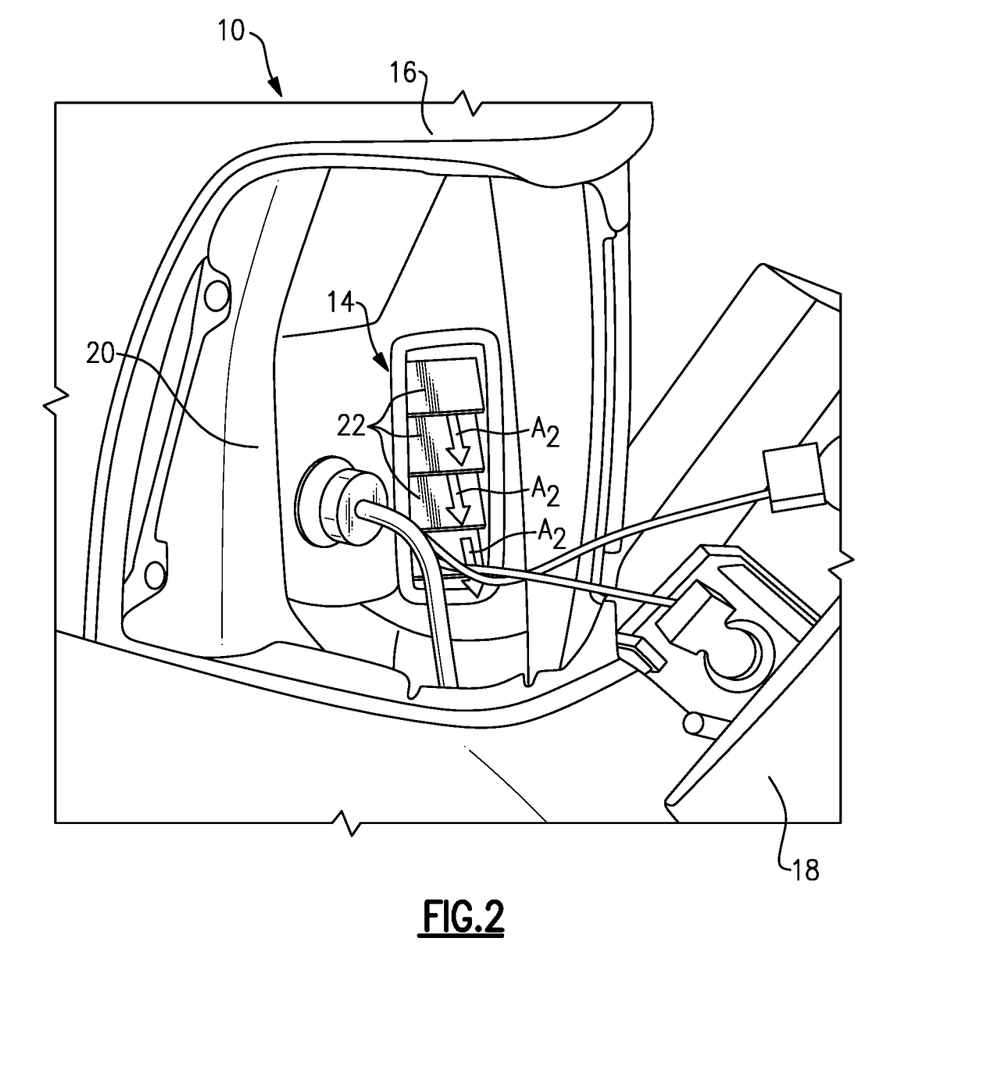
FIG. 2 is a close-up view of an example valve assembly.

FIG. 2 illustrates an example pressure relief valve 14 positioned in a cavity 20 configured to receive the tail lamp 18. In FIG. 2, the tail lamp 18 is removed from the rear fascia 16 of the vehicle 10 for ease of illustrating the pressure relief valve 14. The pressure relief valve 14, in this example, includes three flaps 22 configured to direct air $A_2$ from the passenger cabin to the outside environment. While the illustrated pressure relief valve 14 includes three flaps, it should be understood that this disclosure extends to pressure relief valves 14 that have at least one flap.

The flaps 22 are moveable between an open position in which air $A_2$ is allowed to exit the passenger cabin, and a closed position in which air $A_2$ is prevented from exiting the passenger cabin. As described in detail below, the flaps 22 are actively moved between the open and closed positions by shape-memory alloy (SMA) wires.

Figure 3:
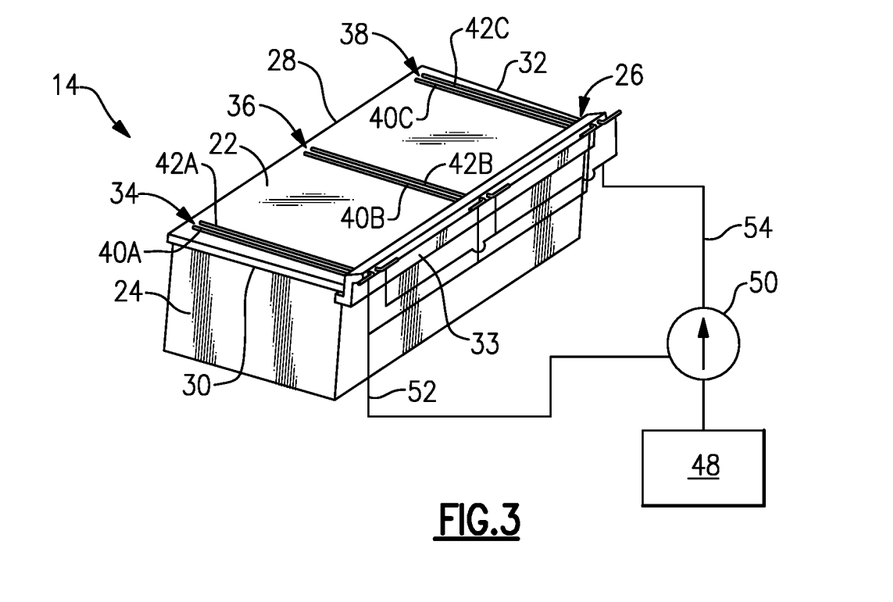
FIG. 3 illustrates an example valve assembly in a closed position.

FIG. 3 illustrates a valve assembly according to this disclosure. Specifically, FIG. 3 illustrates a pressure relief valve 14 including a flap 22. The flap 22 is moveable between an open position and a closed position. In FIG. 3, the flap 22 is in the closed position relative to a housing 24 of the valve assembly. In this example, the flap 22 and housing 24 are rectangular, and has an opening 56 (FIG. 5) that is selectively covered by the flap 22. Together, the flap 22 and housing 24 form a flow regulator, or valve.

The flap 22 includes a hinged end 26 about which the remainder of the flap 22 pivots relative to the housing 24. Opposite the hinged end 26, the flap 22 includes a free end 28 between first and second sides 30, 32. The flap 22 may be made of a polyurethane or polymer material, as examples, and is configured to seal against the housing 24 when in the closed position. This disclosure is not limited to any particular material type of the flap 22.

Figure 4:
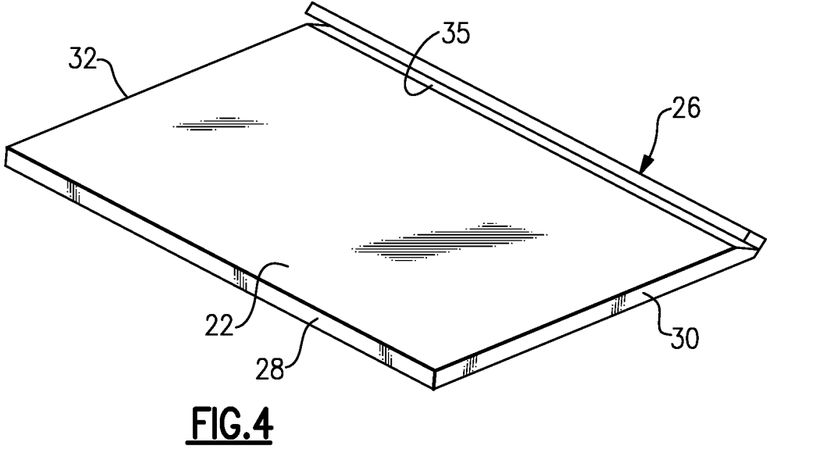
FIG. 4 illustrates an example flap including a cutout.

In one example, the housing 24 includes a flange 33 projecting upward from a side thereof adjacent the hinged end 26 of the flap 22, and the hinged end 26 of the flap 22 is attached to the flange 33 using a known attachment technique. With reference to FIG. 4, the hinged end 26 of the flap 22 may include a cutout 35, which is illustrated in FIG. 4, configured to increase the ease of flexing the flap 22. In this example, the cutout 35 is a V-shaped notch extending along an entire dimension of the flap 22 between the first and second sides 30, 32.

The flap 22 includes a plurality of SMA wires configured to rebound to different rebound shapes to urge the flap to the open and closed positions. SMA wires are deformable and are configured to return, or "rebound," to their original shape, or their "rebound shape," upon application of heat. In this disclosure, heat is applied to the SMA wires by directing electric current to the SMA wires.

With reference to FIG. 3, the flap 22 includes three sets of flap-moving wires, which in this disclosure are sets of SMA wires 34, 36, 38. Each set of SMA wires 34, 36, 38 includes two SMA wires. In particular, each set of SMA wires 34, 36, 38 includes a first shape-memory alloy wire 40A, 40B, 40C configured to rebound to a first rebound shape to urge the flap 22 to an open position (FIG. 6), and a second shape-memory alloy wire 42A, 42B, 42C configured to rebound to a second rebound shape to urge the flap 22 to a closed position (FIG. 3).

The SMA wires 40A-40C, 42A-42C may be provided by any known SMA material, such as copper-aluminium-nickel and nickel-titanium (NiTi) alloys, as examples. This disclosure extends to other SMA materials, including but not limited to materials created by alloying zinc, copper, gold and iron.

The first and second SMA wires 40A-40C, 42A-42C project from the hinged end 26 of the flap 22 substantially to the free end 28. Further, the first and second SMA wires 40A-40C, 42A-42C are connected to the flange 33, and in one example the first and second SMA wires 40A-40C, 42A-42C project through the flange 33 to facilitate an electrical connection, such as that described below.

In this example, the flap 22 includes three sets of SMA wires. The first and third sets 34, 38 are located adjacent first and second sides 30, 32 of the flap 22, respectively. The flap 22 also includes another set 36 of SMA wires substantially between the first and second sides 30, 32 of the flap 22. However, it should be understood that this disclosure extends to flaps 22 that include one or more sets of SMA wires, depending on the force needed to move a particular flap between and open and closed position.

The flap 22 is overmolded with the SMA wires 40A-40C, 42A-42C in this example. Overmolding is the process of adding material, such as the material forming the flap, over already-existing pieces or parts, such as the SMA wires, using a molding process. The result is an integrated component including the original piece or pieces and the additional material added via the overmolding process. Before overmolding, the SMA wires 40A-40C, 42A-42C are formed such that their rebound shapes urge the flap 22 between the open and closed positions.

Figure 5:
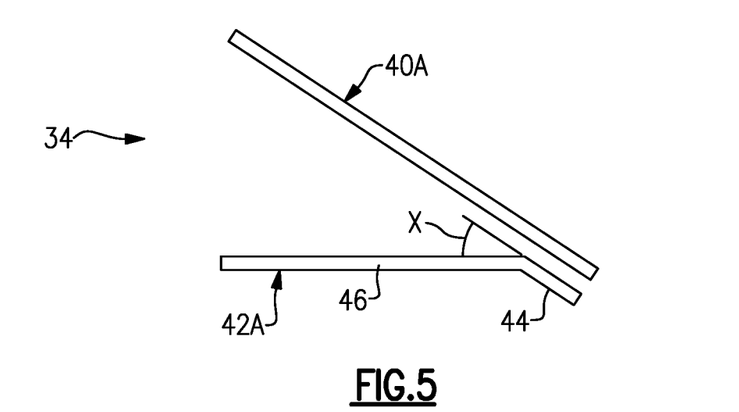
FIG. 5 schematically illustrates a set of shape-memory alloy wires formed such that the wires have different rebound shapes.

In one example, the SMA wires 40A-40C, 42A-42C are provided with their respective rebound shapes by molding the SMA wires 40A-40C, 42A-42C in different positions. With reference to FIG. 5, which illustrates the SMA wires 40A, 42A associated with the first set 34, the first SMA wire 40A is hard formed in a straight position. The second SMA wire 42A is hard formed with a straight portion 44 parallel with the SMA wire 40A and a bent portion 46, which is inclined at an angle X relative to the SMA wire 42A and the straight portion 44. In this example, the wires 40A, 42A are hard formed by heating the SMA wires to a temperature of about 300° F. (about 149° C.), working the wires 40A, 42A at temperature into the positions shown in FIG. 4, and then allowing the wires 40A, 42A to cool. The wires 40A, 42A may be worked into the illustrated positions by molding or using some other manufacturing technique.

Figure 6:
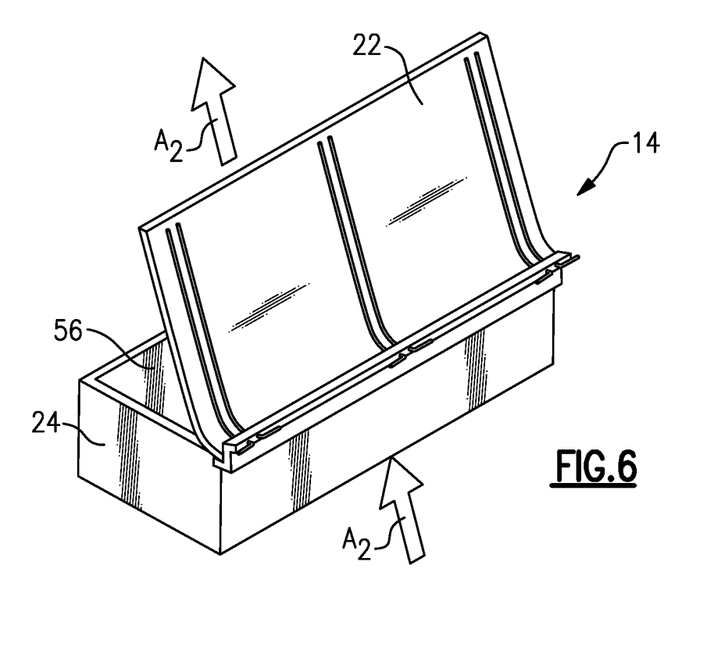
FIG. 6 illustrates the valve assembly of FIG. 3 in an open position.

FIG. 5 illustrates the wires 40A, 42A in their respective rebound shapes. The rebound shape of the first SMA wire 40A is configured to urge the flap 22 to the open position (FIG. 6). The rebound shape of the second SMA wire 42A is configured to urge the flap 22 to the closed position (FIG. 3). It should be understood that while only the first set of SMA wires 34 is shown in FIG. 5, that the remaining sets 36, 38 are arranged similarly.

The SMA wires 40A-40C, 42A-42C are configured to return to their rebound shapes upon application of heat. In this disclosure, heat is selectively applied to the SMA wires 40A-40C, 42A-42C by directing current through the SMA wires 40A-40C, 42A-42C.

With reference again to FIG. 3, the valve assembly includes a controller 48 configured to selectively command the first and second SMA wires 40A-40C, 42A-42C to move to their respective first and second rebound shapes. The controller 48 is shown schematically in FIG. 3. It should be understood that the controller 48 could be part of an overall vehicle control module, such as a vehicle system controller (VSC), or could alternatively be a stand-alone controller separate from the VSC. Further, the controller 48 may be programmed with executable instructions for interfacing with and operating the various components of the vehicle 10. The controller 48 additionally includes a processing unit and non-transitory memory for executing the various control strategies and modes of the vehicle system.

In this disclosure, the controller 48 is configured to selectively command a current source 50 to direct current to one of the first and second shape-memory alloy wires 40A-40C, 42A-42C. The current source 50 is also shown schematically in FIG. 3, and is an electronic circuit that is responsive to instructions from the controller 48 to deliver electric current. While the controller 48 and the current source 50 are shown separately, the controller 48 could include the current source 50 in some examples.

The current source 50 is electrically coupled to the first SMA wires 40A-40C by a first electrical connection 52 and is electrically coupled to the second SMA wires 42A-42C by a second electrical connection 54. In one example, the first SMA wires 40A-40C are electrically coupled to the current source 50 in series. In another example, the first SMA wires 40A-40C are electrically coupled to the current source 50 in parallel. Likewise, the second SMA wires 42A-42C may be electrically coupled to the current source 50 in series or parallel.

With reference to the arrangement of FIG. 3, in order to close the flap 22, the controller 48 commands the current source 50 to direct current to the second SMA wires 42A-42C via the second electrical connection 54. Doing so heats the second SMA wires 42A-42C and urges the second SMA wires 42A-42C to their respective rebound shapes, which corresponds to the flap 22 being in the closed position of FIG. 3. When in the closed position, the first SMA wires 40A-40C are deformed relative to their respective rebound shapes. Thus, in order to open the flap 22, the controller 48 commands the current source 50 to direct current to the first SMA wires 40A-40C via the first electrical connection 52 and to cease directing current to the second SMA wires 42A-42C. Doing so heats the first SMA wires 40A-40C and urges them to the open position, as illustrated in FIG. 6. When in the open position, the flap 22 allows air $A_2$ to flow through an opening 56 in the housing 24 of the pressure relief valve 14 and out of the passenger compartment of the vehicle 10.

The controller 48 may command the flap 22 to the open position when an event occurs that is known to correspond to pressure build-up within the passenger compartment of the vehicle 10. Such conditions include when only one window of the vehicle begins to roll down or when a door is closed. In the former example, the flap 22 may be commanded to the open position when a window begins rolling down, and may be commanded to the closed position after the all windows are rolled back up, for example. In the latter example, the flap 22 may be commanded to the open position when a vehicle door opens, and may be commanded back to the closed position after all vehicle doors are closed.

While the discussion relative to FIGS. 3-6 is made relative to a single flap 22, it should be understood that each flap 22 of the pressure relief valve 14, for example, could be arranged as shown and described relative to FIGS. 3-6. That is, if the pressure relief valve 14 includes multiple flaps, each flap can include one or more sets of SMA wires configured to open and close each respective flap.

Figure 7A:
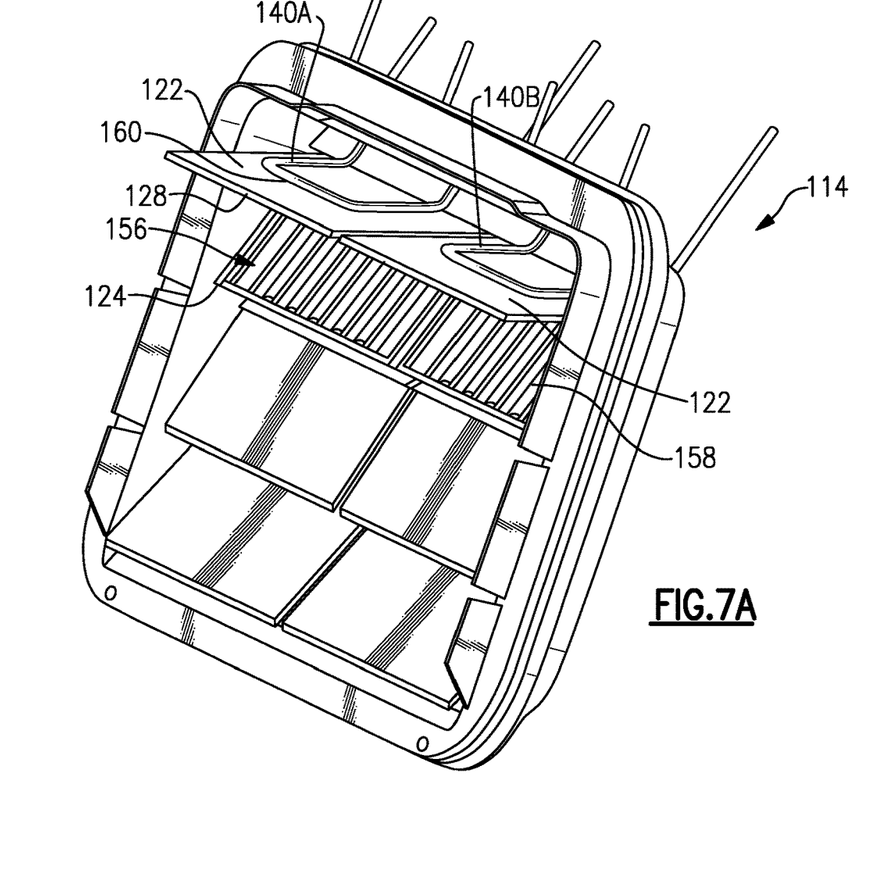
FIG. 7A illustrates a second example valve assembly with two flaps in an open position from a top perspective.
Figure 7B:
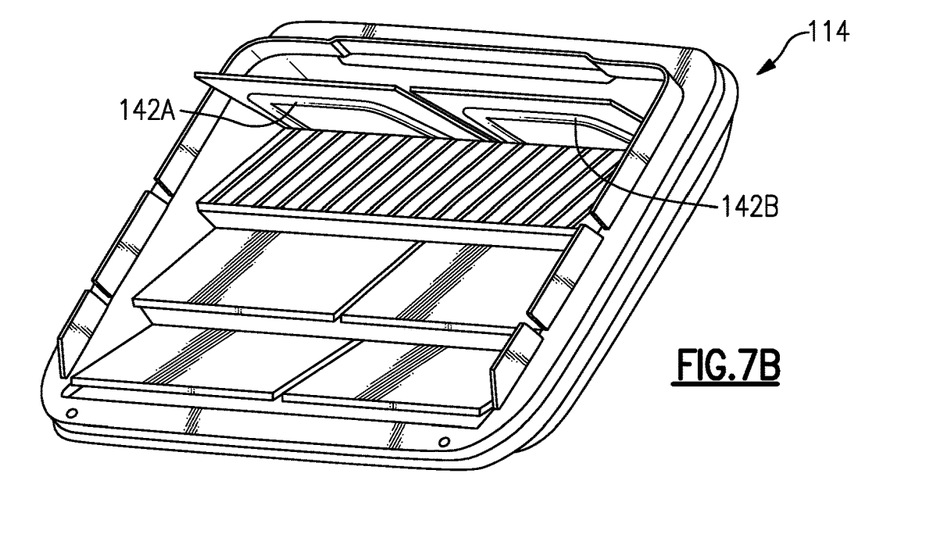
FIG. 7B illustrates the second example valve assembly with two flaps in an open position from a bottom perspective.

FIGS. 7A and 7B illustrate a second example pressure relief valve 114. The pressure relief valve 114 is similar to the pressure relief valve 14 except where otherwise described below, and like components have like reference numerals preappended with a "1."

As noted above, the previously described pressure relief valve 14 could have additional flaps 22. One example flap arrangement is shown in FIGS. 7A and 7B. With reference to those figures, the pressure relief valve 114 includes three rows of flaps 122, each having two flaps, for a total of six flaps. The flaps 122 are configured to open and close to cover an opening 156 formed in a housing 124. In this example, a plurality of vanes 158 are provided in the opening 156 for directing air flow.

The flaps 122 in the top row are shown in the open position and the flaps in the bottom two rows are shown in the closed position. The flaps 122, like the flaps 22, are moveable between the open and closed position by SMA wires. With joint reference to FIGS. 7A and 7B, the flaps 122 include first SMA wires 140A, 140B on a top surface thereof, and second SMA wires 142A, 142B on a bottom surface thereof. The first and second SMA wires 140A, 140B, 142A, 142B are electrically coupled to a controller and a current source, as described above, and function substantially the same way as the above-described SMA wires.

Further, the first and second SMA wires 140A, 140B, 142A, 142B are arranged such that they substantially define a U-shape with respect to each flap 122. In particular, with reference to the first SMA wire 140A, each SMA wire has a bend 160 provided adjacent a free end 128 of each flap 122. Such an arrangement may provide additional lift at the free end 128 of the flap 122. While two SMA wire configurations are shown and described in this disclosure, it should be understood that this disclosure extends to other SMA wire configurations.

It should be understood that terms such as "about," "substantially," and "generally" are not intended to be boundaryless terms, and should be interpreted consistent with the way one skilled in the art would interpret those terms. Further, directional terms such as "top" and "bottom" are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A valve assembly for a motor vehicle, comprising:
a housing having an opening;
a flap moveable to between an open position in which the flap is positioned such that air is permitted to flow through the opening and a closed position in which the flap is positioned such that air is prevented from flowing through the opening;
a first shape-memory alloy wire in direct contact with the flap and configured to rebound to a first rebound shape to urge the flap to the open position;
a second shape-memory alloy wire in direct contact with the flap and configured to rebound to a second rebound shape to urge the flap to the closed position; and
a controller configured to selectively command one of the first and second shape-memory alloy wires to move to a respective one of the first and second rebound shapes,
wherein the first shape-memory alloy wire and the second shape-memory alloy wire provide a first set of flap-moving wires, and wherein the valve assembly includes a plurality of sets of flap-moving wires, and
wherein the flap includes a hinged end and a free end, and wherein the first and second shape-memory alloy wires project from the hinged end substantially to the free end.

2. The valve assembly as recited in claim 1, wherein the flap includes a first side and a second side between the hinged end and the free end, and wherein the first set of flap-moving wires is positioned adjacent the first side and a second set of flap-moving wires is positioned adjacent the second side.

3. The valve assembly as recited in claim 2, wherein a third set of flap-moving wires is positioned substantially between the first and second sides.

4. The valve assembly as recited in claim 1, wherein the flap is one of a plurality of flaps, and wherein each of the flaps includes at least one set of flap-moving wires.

5. The valve assembly as recited in claim 1, wherein each of the first shape-memory alloy wires and each of the second shape-memory alloy wires are configured to rebound to a respective first and second rebound shape upon application of heat.

6. The valve assembly as recited in claim 5, further comprising a current source, and wherein the controller is configured to selectively command the current source to direct current to one of the first and second shape-memory alloy wires.

7. A valve assembly for a motor vehicle, comprising:
a housing having an opening;
a flap moveable to between an open position in which the flap is positioned such that air is permitted to flow through the opening and a closed position in which the flap is positioned such that air is prevented from flowing through the opening;
a first shape-memory alloy wire in direct contact with the flap and configured to rebound to a first rebound shape to urge the flap to the open position; and
a second shape-memory alloy wire in direct contact with the flap and configured to rebound to a second rebound shape to urge the flap to the closed position,
wherein the flap is overmolded with the first and second shape-memory alloy wires.

* * * * *